(12) United States Patent
Fork et al.

(10) Patent No.: US 9,643,394 B2
(45) Date of Patent: May 9, 2017

(54) OBLIQUE ANGLE MICROMACHINING OF FLUIDIC STRUCTURES

(75) Inventors: David K. Fork, Mountain View, CA (US); Scott E. Solberg, Mountain View, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 443 days.

(21) Appl. No.: 13/019,246

(22) Filed: Feb. 1, 2011

(65) Prior Publication Data
US 2012/0193023 A1    Aug. 2, 2012

(51) Int. Cl.
| B29C 47/06 | (2006.01) |
| B29C 47/12 | (2006.01) |
| B32B 38/10 | (2006.01) |
| B29C 47/70 | (2006.01) |
| B29C 47/00 | (2006.01) |
| B29C 47/08 | (2006.01) |

(52) U.S. Cl.
CPC .......... *B32B 38/10* (2013.01); *B29C 47/0002* (2013.01); *B29C 47/0021* (2013.01); *B29C 47/06* (2013.01); *B29C 47/0883* (2013.01); *B29C 47/128* (2013.01); *B29C 47/705* (2013.01); *B29C 47/707* (2013.01); *Y10T 156/1082* (2015.01)

(58) Field of Classification Search
CPC . B29C 47/0002; B29C 47/0021; B29C 47/06; B29C 47/0883; B29C 47/128; B29C 47/362; B29C 47/705; B29C 47/707
USPC ...... 425/192 R, 133.5, 382 R, 461, 462, 463
See application file for complete search history.

(56) References Cited

U.S. PATENT DOCUMENTS

| 3,561,053 A * | 2/1971 | Pearson ................... 425/192 R |
| 2007/0110836 A1* | 5/2007 | Fork et al. ................ 425/133.5 |
| 2008/0099952 A1* | 5/2008 | Fork et al. ............... 264/173.16 |
| 2009/0057944 A1* | 3/2009 | Fork et al. ................ 264/177.1 |
| 2009/0146339 A1* | 6/2009 | Malone et al. .......... 264/211.23 |
| 2010/0118081 A1* | 5/2010 | Fork ............................... 347/22 |
| 2011/0268906 A1* | 11/2011 | Ausen et al. .................. 428/54 |
| 2012/0308755 A1* | 12/2012 | Gorman et al. ................ 428/43 |

* cited by examiner

*Primary Examiner* — Alison L Hindenlang
*Assistant Examiner* — Joseph Leyson
(74) *Attorney, Agent, or Firm* — Marger Johnson

(57) ABSTRACT

An extrusion device has a stack of at least two layers, the stack including an outlet, an inlet for a first material, and a feed channel for the first material arranged to fluidically connect to the inlet for the first material, the feed channel having a sloped end. A method of manufacturing an extrusion device includes forming an outlet, an inlet for a first material and a feed channel for the first material having a sloped end in a stack of layers, aligning the stack of layers to fluidically connect the feed channel for the first material with the inlet for the first material and to fluidically connect the inlet for the first material with the outlet, and bonding the layers together.

10 Claims, 5 Drawing Sheets

OBLIQUE ANGLE MICROMACHINING OF FLUIDIC STRUCTURES

BACKGROUND

To ensure steady extrusion of paste through a die, it is desirable to reduce static zones caused by abrupt contractions.

These static zones can be reduced by reducing the angle of the die entry, where 90 degrees is the maximum, in conventional macro-extruders. Conventional macro-extruders generally have a size large enough to allow sloped die entry using machining, molding, or other well-known methods. By contrast, a micro-extruder has a minimum channel cross-section of less than approximately 200 microns.

Due to the smaller channel size, previously unconsidered issues arise in micro-extruders. For example, the material in the 'static zone' can eventually dislodge and re-enter the extrusion stream and cause clogging of the extrusion nozzle. Also, blobs of weakly-agglomerated particles in the paste are more likely to be trapped at the steps, thus partially blocking the channel. In macro-extruders, the die entries are generally large enough relative to paste particle sizes such that this does not usually become a problem.

DETAILED DESCRIPTION OF THE EMBODIMENTS

Figure 1:
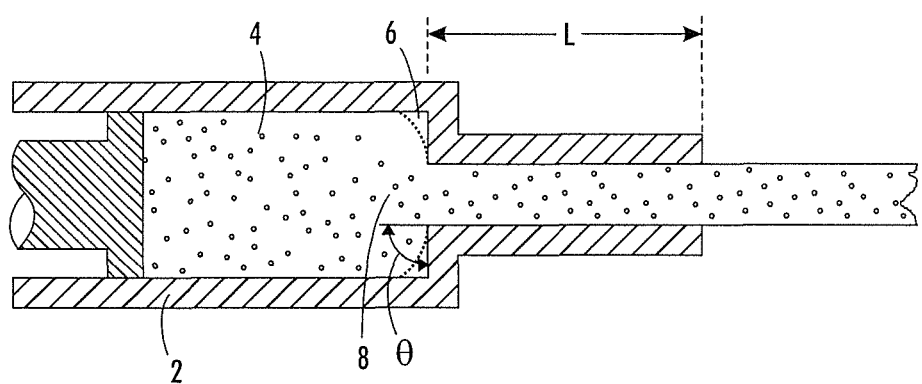
FIG. 1 shows a convention macro-extruder and its associated path.

FIG. 1 shows a conventional extruder, referred to here as a macro-extruder. This figure is based upon a FIG. 4.3 of *Paste Flow and Extrusion*, by Benbow and Bridgewater. In the extruder shown, the barrel 2 of the extruder has a die entry 8 into a narrower die land. The paste 4 travels across the abrupt step having the 90 degree angle shown as it moves from the barrel into the die land. This results in what the book refers to as 'static zones' such as 6. The reduction of this zone results in better extruder performance. By reducing the die entry angle θ, one can reduce the static zone. For reference, an abrupt step would have an angle of 90 degrees.

The extruder of FIG. 1 is referred to as a macro-extruder, because the sloped entry may be easily fabricated using machining, molding or other well-known methods. Experiments have shown, however, that micro-extruders have issues not contemplated in the macro-extruder. As used here, a micro-extruder or extrusion device is one that has minimum channel cross-section of about 200 microns or less. These devices typically have channel cross-sections in the range of 50-75 microns.

Macro-extruders, while they may suffer from unsteady flow depending on the paste and channel characteristics, do not usually suffer from clogging problems, because the channel cross-sections are usually much larger than the particle sizes. However, it has been observed in experiments with micro-extruders that clogs result from the constrictions caused by the paste particles filling the static zones at transitions between channel sections.

Micro-extruders of the present invention consist of layers of material having various vias and channels to bring the paste material or materials from the relatively large external ports to the relatively small extrusion dies or nozzles. Typically, polymer layers reduce the wall friction and potential paste clogging, but other materials such as metals, glasses, and ceramics may be suited for some applications.

For cutting such small features in polymer sheets, laser ablation has proven to be very effective. Cutting techniques such as milling, die-cutting, electro-chemical machining, etc. are either not practical or will not work for such polymer samples. Cutting completely through the polymer layers has so far proven to be more repeatable than attempting to cut trenches by partially cutting through the layer. However, the through-cut openings in the polymer layers made by prior art cutting techniques create abrupt 90 degree steps in the fluid path for the completed assembly, resulting in the clogs discussed above. Therefore, it becomes necessary to find a repeatable way to eliminate the abrupt 90 degree steps in the fluid path resulting from conventional laser through-cutting.

It appears that the simplest and most effective method for avoiding 90 degree steps in through-cut polymer sheets uses oblique incidence laser ablation. For example, a 45 degree incidence angle worked well in experiments to create a more swept internal paste flow path for the assembled micro-extruder or extrusion device. The sample being cut, the laser beam, or both, may tilt during all or part of the cutting process. Some features may be cut at a normal angle of incidence and only the critical flow features cut at the oblique angle, or all features may be cut at the oblique angle. In some embodiments, discussed in more detail later, tilted ablation provides a non-rectangular shape to the material being extruded. In another embodiment, the flow passages dilate, or become larger, as the paste flow transitions from layer to layer in the extruder assembly.

Figure 2:
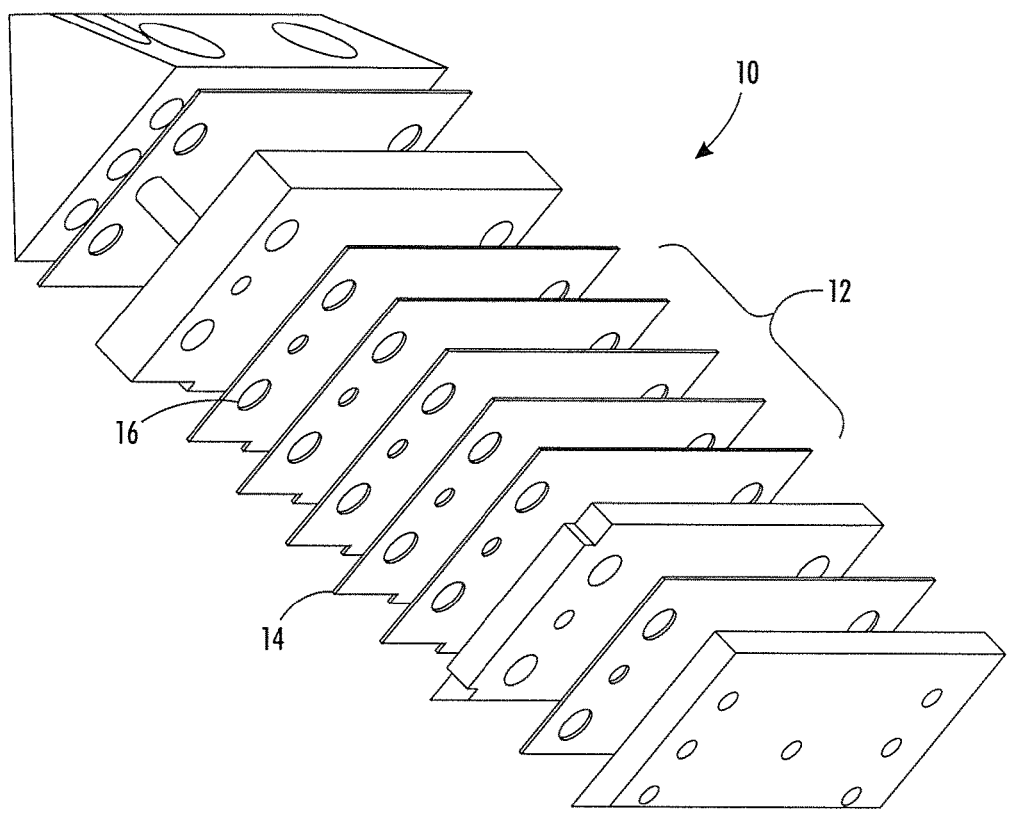
FIG. 2 shows an embodiment of an extrusion device constructed from layers.

FIG. 2 shows an example of an extrusion device 10 constructed of layers of some material such as polymer. This extrusion device may be referred to as a co-extrusion device because it extrudes a stream of at least two materials. In this particular embodiment, the four central layers, noted by the bracket 12, consist of layers of polymer or other material At least one of the materials to be extruded, also referred to as extrudate, begins its path from the external ports to the micro channels at layer 16. The layers are aligned and clamped or otherwise held together to form the extrusion device.

Figure 3:
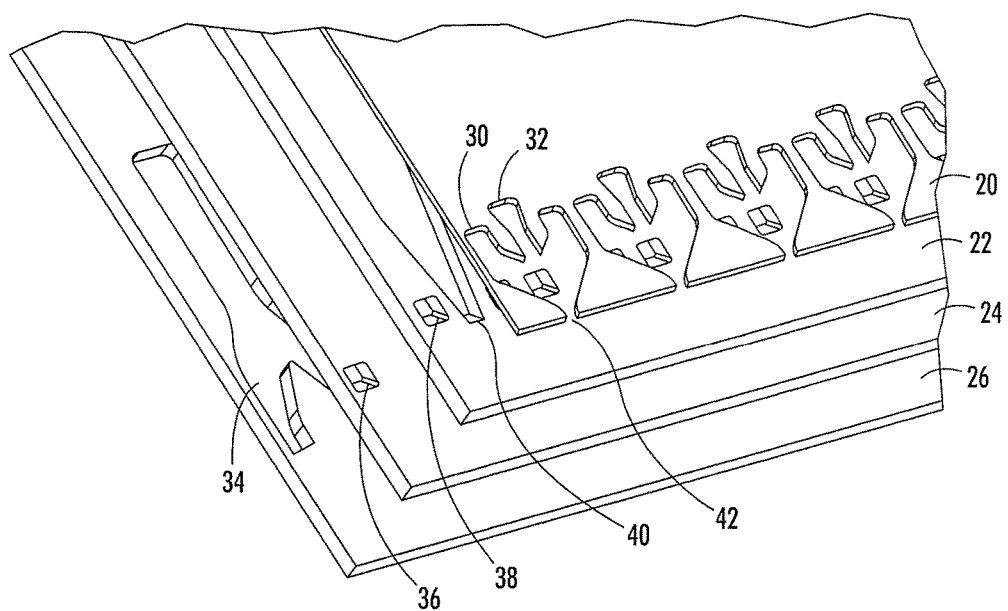
FIG. 3 shows an embodiment of layers of an extrusion device constructed from layers having angled structures.

FIG. 3 shows these layers in more detail. The nozzle, exit orifice or outlet 42 extrudes a stream of materials. The first material flows through the feed channel 40, from which the first material transitions upwards into the inlet channel 32 and then flows toward the outlet 42.

A second material flows through an inlet for the second material 30 and joins with the first material. One should note that the flows may join without mixing, with the final flow exiting the outlet 42 consisting of 'stripes' of the first material and the second material. The inlet 30 receives the second material through the port 38 in layer 22. An additional layer 24 may also have a port 36, which is fed the second material from the feed channel for the second material 34 in layer 26. When the layers are aligned and stacked, the feed channel 34 will align through the ports with the inlet 30. The stack of layers may consist of only two layers, one for the inlets and the nozzle and one for the feed channel.

In this particular embodiment, the second material may consist of a sacrificial material that has flows on either side of the first material, resulting in three stripes of materials exiting the outlet 42. Once extruded and solidified such as by drying, curing, or firing, the second material may be removed, leaving separated stripes of the first material.

To reduce clogging at the transition between the feed channel 40 and the inlet 32, the end of the feed channel has a ramp or slope. In one experiment the ramp was of approximately 45 degrees and the clogging was significantly reduced. Optionally, the feed channel 34 and the ports 36 and 38 may also have ramps or angled edges to produce a more swept flow of material to the inlet such as 30 of the second material.

One should note that while most of the examples here are for a co-extrusion device in which two or more materials are extruded, the structures and techniques implemented here apply equally to a mono-extruder.

Figure 4:
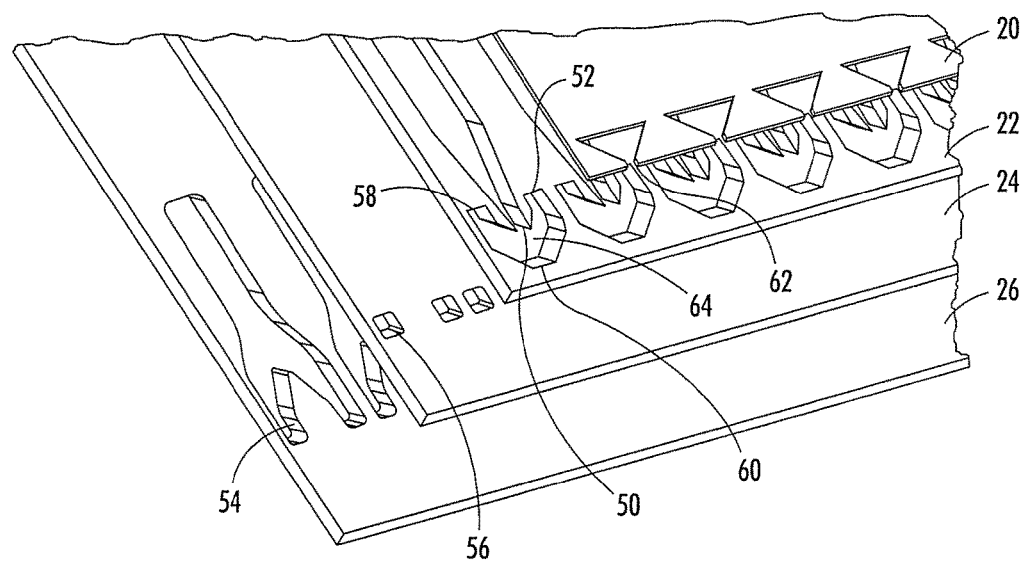
FIG. 4 shows an alternative embodiment of an extrusion device.

FIG. 4 shows an alternative embodiment of the extrusion device. In this embodiment, the feed channel and the inlet 50 for the first material reside in the same layer. Also residing in the same layer are the inlets 52 and 58 for the second material. The three flows of material join in the merge portion of the layer 64, ultimately exiting the stack of layers through the nozzle 62 that resides in a layer separate from the inlets, feed channel and merge portion. The stack of layers may consist of only the two layers, one for the inlets and the feed channel and one for the nozzle.

However, in the embodiment shown, a second material joins the first material in the merge portion 64. The second material enters the stack of layers through the feed channel 54 in layer 26 and transitions upwards through the ports such as 56 to the inlet 58 and ultimately exiting the stack through the outlet 62. In this embodiment, the merge portion of the opening in layer 22 has a ramped or sloped end 60 that improves the paste flow as discussed above. While no limitation is intended and none should be implied, it is believed that the ramp or slope should be of 70 degrees or less in the flow path, where 90 degrees is a wall step and 0 is a smooth channel.

As discussed above, the layers are aligned and stacked to form the vias and channels that make up the fluid path. Typically, penetrating guide-pin holes on each layer achieve layer to layer alignment, with two or more close-fitting guide pins that fix the positions of the parts in the layer plane. Misalignment of the layers occurs due to the size and placement tolerances on the guide pin holes within each layer. The fluidic feature alignment from layer to layer also suffers from the errors in the size and placement of the features such as feed channels, inlets, outlets and merge portions on each layer.

To minimize any flow impedance due to steps caused by layer misalignment, one can nest the openings from layer to layer such that the open area of the overlapping features remains unchanged within the alignment tolerance. Typically the nesting results from either shrinking or growing the feature dimensions from one layer to the next. Experiments performed here indicate that growing the features in the downstream direction such that the openings in each layer are larger than the preceding layer in the fluid path assists in avoiding upstream dead volumes. This is desirable because paste flow expansion steps seem to cause less channel clogging than contraction steps.

It is often difficult to deliver the laser beam accurately to the part with multiple angles and precise registration of features at more than one angle. One method of manufacturing the layers machines all of the features other than the exit face of the outlet with a fixed oblique angle. The part is then mounted to an alignment jig and machining the exit face separately such as by laser cutting, milling, planning, skiving, water jet cutting, etc.

In another embodiment, either the part fixture or the beam delivery system can accurately deliver multiple angles of incidence of the laser beam to the part. This allows creation of more than one side wall angle to the features placed in the part. This method has utility for each reducing the dead volume in the fluid channel at both the entry and exit or produce shaped trapezoidal or triangular structures to inject or extrude optimal line shapes of the materials.

Figure 5:
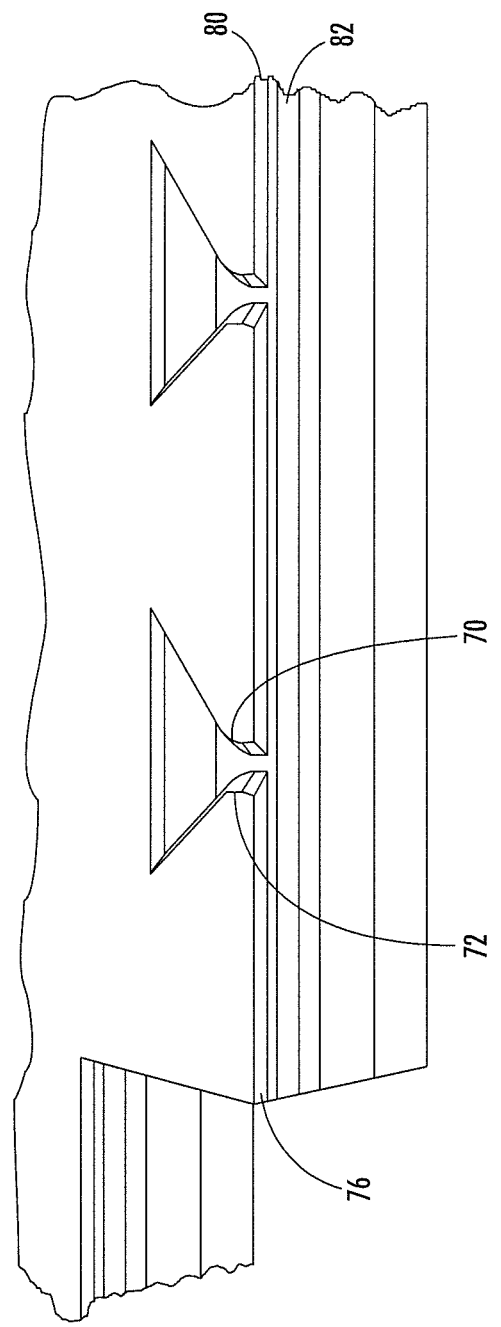
FIG. 5 shows an embodiment of an outlet for an extrusion device.

FIG. 5 shows an example of a pair of nozzle or outlet orifices machined with a particular combination of oblique and normal incidence angles to produce an extrudate having a trapezoidal cross section. The left and right nozzle edges, 72 and 70, tilt inward at opposite oblique angles, where the nozzle is 80 and the merge layer is 82. These angles shape the material into a trapezoidal shape as it exits the nozzle. Optionally, the back edge of the nozzle may be tilted at a third unique angle to sweep the flow as it transitions from the merge layer to the nozzle layer. The exit facet at the front of the nozzle may be formed at a 90 degree angle to the layer surface. These four separate angles typify the fabrication requirements of the trapezoidal extrusion nozzle.

While the above discussion assumes through-cutting of the polymer layers using laser ablation, other variations and possibilities exist. For example, one could cut trenches in the layers with the depth of the trench varying to create a gently sloping flow path rather than an abrupt step. While more difficult to cut reliably with current laser technology, such trenches would nevertheless achieve the desired result of reducing the die entrance angle. Abrasive jet cutting may also replace laser cutting.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An extrusion device, comprising:
 a stack of at least two layers, the stack including:
  an outlet in a first of the layers;
  an inlet for a first material in a second layer;
  an inlet for a second material in the second layer;
  a merge portion in the second layer, arranged to merge flows of the first and second materials prior to the outlet, the merge portion having a sloped end; and
  a feed channel in the second layer for the first material arranged to fluidically connect to the inlet for the first material, wherein the first layer is stacked against the second layer.

2. The extrusion device of claim 1, further comprising a feed channel for the second material in a fourth layer which connects to the inlet for the second material through a port in a third layer.

3. The extrusion device of claim 1, wherein the sloped end of the has an angle of less than 70 degrees.

4. The extrusion device of claim 2, wherein the port has at least one angled side.

5. The extrusion device of claim 1, wherein there are two inlets for the second material arranged on either side of the inlet for the first material.

6. The extrusion device of claim 1, further comprising a third layer having a feed channel for the second material arranged to fluidically connect to the inlet for the second material when the layers are stacked.

7. The extrusion device of claim 6, further comprising a fourth layer having at least one port arranged to provide fluid connection between the third layer and the first layer.

8. The extrusion device of claim 7, wherein the port has at least one angled side.

9. The extrusion device of claim 1, wherein the outlet has angled sides.

10. The extrusion device of claim 1, wherein the layers are stacked such that a fluid path traverses an opening in the feed channel of the first material, an opening in the inlet for the first material and the outlet.

* * * * *